(12) United States Patent
Takeda et al.

(10) Patent No.: US 6,248,479 B1
(45) Date of Patent: Jun. 19, 2001

(54) SECONDARY BATTERY

(75) Inventors: Kazunari Takeda; Tomohiko Noda; Syuichi Izuchi; Tokuo Inamasu, all of Takatsuki (JP)

(73) Assignee: Yuasa Corporation, Takatsuki (JP)

( * ) Notice: Subject to any disclaimer, the term of this patent is extended or adjusted under 35 U.S.C. 154(b) by 1526 days.

(21) Appl. No.: 08/513,419

(22) Filed: Aug. 10, 1995

Related U.S. Application Data

(63) Continuation of application No. 08/117,133, filed as application No. PCT/JP93/00040 on Jan. 14, 1993, now abandoned.

(30) Foreign Application Priority Data

Jan. 17, 1992 (JP) ........................................ 4-27417

(51) Int. Cl.$^7$ ............................ H01M 4/62; H01M 10/40
(52) U.S. Cl. ............................................. 429/300; 429/213
(58) Field of Search ................................ 429/192, 213, 429/218

(56) References Cited

U.S. PATENT DOCUMENTS

| | | |
|---|---|---|
| 4,808,496 | 2/1989 | Hope et al. |
| 4,908,283 * | 3/1990 | Takahashi et al. ............... 429/192 |
| 5,240,791 * | 8/1993 | Iziti et al. ......................... 429/192 |

FOREIGN PATENT DOCUMENTS

| | | |
|---|---|---|
| 0098772 | 1/1984 | (EP) . |
| 0318161 | 5/1989 | (EP) . |
| 0396324 | 11/1990 | (EP) . |
| 0404578 * | 12/1990 | (EP) . |
| 2606220 | 6/1988 | (FR) . |
| 2632455 | 12/1989 | (FR) . |
| 63-94563 | 4/1988 | (JP) . |
| 63-152885 | 6/1988 | (JP) . |
| 63-164176 * | 7/1988 | (JP) . |
| 1107470 | 4/1989 | (JP) . |
| 240867 | 2/1990 | (JP) . |

OTHER PUBLICATIONS

Patent Abstracts of Japan, vol. 15, No. 425, (C–0879) Oct. 29, 1991.

Patent Abstracts of Japan, vol. 12, No. 452, (E–687), Nov. 28, 1988.

* cited by examiner

Primary Examiner—Carol Chaney
(74) Attorney, Agent, or Firm—Evenson, McKeown, Edwards & Lenahan, P.L.L.C.

(57) ABSTRACT

A secondary battery improved in its cathode composite, electrolyte and anode composite in order to accomplish an excellent charge/discharge characteristic, a long-term reliability and a high performance. The secondary battery is characterized in that the electrolyte is composed of an ion-conductive high-molecular compound including one or more kinds of ionic compounds in a dissolution state, and both the cathode composite and the anode composite have the ion-conductive high-molecular compound as their component material.

1 Claim, 1 Drawing Sheet

SECONDARY BATTERY

This application is a continuation of application Ser. No. 08/117,133, filed on Sep. 14, 1993, now abandoned. Which is a 371 of PCT/JP93/00040 filed Jan. 14, 1993.

TECHNICAL FIELD

This invention relates to an improvement in a cathode, an electrolyte and an anode in a secondary battery operating reversibly under an environmental temperature.

BACKGROUND ART

With a recent tendency to design various electric equipments into micro-electronic forms, a battery has been housed in an electric equipment and integrated with the electric equipment and its circuit, as represented by power sources for memory back-up of various electric equipments. For this reason, a demand for minimizing a size, a weight and a thickness of battery and a request for battery having a large energy density have been increasing. In a field of primary battery, a small-sized and light-weight battery such as a lithium battery has already been put to practical use, however, its application field is limited to a small region. Under these circumstances, in a field of secondary battery, a battery utilizing nonaqueous electrolyte, which can be made smaller in size and weight, attracts public attention at present as an alternate battery in place of a conventional lead-battery and a nickel-cadmium battery. However, in the battery utilizing the nonaqueous electrolyte, an electrode active material which can satisfy practical physical properties such as a cycle characteristic and a self-discharge characteristic, has not been found yet. Therefore, investigations are carried on still now in many research organizations.

Here, in order to obtain a small-sized and light-weight battery having a large energy density and a high reliability, it is necessary to examine the following problems (1) and (2).

(1) Problem of electrode active material and electrode
(2) Problem of electrolyte As for the problem (1), the inventor examined a film type battery, that is, a battery having unit cells with thicknesses of 100 to 500 microns and called also as "sheet-shaped" battery. In this kind of battery, however, such problems arose that a manufacture of metallic lithium foil having a desirable performance was somewhat difficult from a technical point of view and that a manufacturing process of battery became complicated. Further, in the secondary battery, such a problem arose that a formation of lithium dendrite and a passivation of interface took place so that use of metallic lithium was restricted. Therefore, investigations on alloys including lithium metals as represented by lithium-aluminum, lithium-zinc and lithium-tin, are being carried on actively. However, the electrode was cracked or broken into fine pieces due to repeated charging and discharging so that the cycle characteristic was not improved even when these alloys were used, because these alloys have small strengths as represented by the lithium-aluminum alloy. As an alternate method for restricting the formation of lithium dendrite, investigations on selection of electrolyte salt and improvement in separator are being tried. As for the separator among them, it is attempted now to restrict the formation of lithium dendrite by laminating non-woven fabrics made of polypropylene and non-woven fabrics made of glass fiber, which have so far been used. However, a substantial solution has not been found yet.

Accordingly, electrode active materials utilizing intercalation or doping phenomenon of layer compound are specially studied now in many research organizations. These materials are expected for their extremely excellent charge/discharge cycle characteristics, because a theoretically complicated chemical reactions does not occur at time of electrochemical reaction in the charging and discharging. Use of carbon material as the electrode active material is a method turned up, during the studies as mentioned above, as a solution for problems of cycle characteristic and self-discharge characteristic of the electrode active material. Features of this carbon material are a high doping capacity, a low self-discharge rate and an excellent cycle characteristic. A feature to be specially mentioned is that it has a base-potential extremely near to that of metallic lithium.

On the other hand, the problem (2) is as described below. A liquid electrolyte, especially prepared by dissolving ionic compound in an organic electrolyte, has so far been used for an electrolyte for a battery utilizing electro-chemical reaction and electro-chemical devices other than the battery, such as electric double-layer capacitor and electro-chromic element etc. However, since there have been troubles such as leakage of electrolyte to battery outside and easiness of elusion and evaporation of electrode material etc. when the liquid electrolyte has been used, problems of long-term reliability and flying-around of electrolyte in a sealing process have remained unsolved. As a means to solve these problems, that is, a means to improve a solution-leakage resistance and a long-term reliability, an ion-conductive high-molecular compound having a large ionic conductivity has been reported and further studied.

Ion-conductive high-molecular compounds being studied now are straight-chain polymer, network crosslink polymer or comb-shaped polymer, of homopolymer or copolymer having ethylene-oxide as its basic unit. It is proposed and practiced that crystallization is avoided by making the compound into forms of network crosslink polymer or comb-shaped polymer for the purpose of increasing the ionic conductivity at a low temperature. Especially, the ion-conductive high-molecular compound using the network crosslink polymer has a large mechanical strength and is excellent in the ionic conductivity at a low temperature, so that it is useful.

Electro-chemical cells using the ion-conductive high-molecular compound are described widely in many patent documents. There are, for example, U.S. Pat. No. 4,303,748 (1981) by Armand etc., U.S. Pat. No. 4,589,197 (1986) by North, and U.S. Pat. No. 4,547,440 (1985) by Hooper etc. A feature which can be mentioned for these cells is the use of ion-conductive high-molecular compound prepared by dissolving ionic compound into high-molecular compound having a polyether structure.

In order to use the ion-conductive high-molecular compound as the electrolyte for batteries utilizing the electro-chemical reaction and the electro-chemical devices other than the battery, it is required for the high-molecular compound to have both the high ionic conductivity and the high mechanical property (mechanical strength and flexibility etc.). However, these properties contradict to each other. In many patent documents described above, for example, the compound is operated principally in a state of high temperature because an ionic conductivity at a temperature lower than room temperature decreases down below a practical range. Therefore, as a simple method for improving the ionic conductivity for example, a method is proposed, in Published Patent Application (KOKAI) No. 59-149601, Published Patent Application (KOKAI) No. 58-75779, U.S. Pat. No. 4,792,504 etc., that an organic solvent (specially preferably, an organic solvent with high permittivity) is added to the ion-conductive high-molecular compound to keep a solid state. In this method, however, the ionic conductivity is improved positively, to be sure, but the mechanical strength is worsened extremely. While, in the electrode active material utilizing intercalation or doping phenomenon of the layer compound, expansion and contraction of the electrode active material are produced accompanied by charging and discharging. To cope with this problem, it is required to improve mechanical strengths of the electrode and the electrolyte.

When the ion-conductive high-molecular compound is used as the electrolyte for electro-chemical devices, it becomes necessary to make the electrolyte into a film shape in order to reduce an internal resistance. Especially, this is important for the film type battery. In case of the ion-conductive high-molecular compound, it is possible to work its uniform film easily into a voluntary shape, and various methods for this purpose are known. There are several methods, for example, such as a method in which a solution of the ion-conductive high-molecular compound is cast and its solvent is evaporated and removed, a method in which polymeric monomer or macromer is applied on a substrate to be heated and polymerized, or a method in which curing is done by means of irradiation of activated ray. It is possible to obtain an uniform film when these methods are used. However, a fine short-circuiting has sometimes occurred due to breakage of the electrolyte layer caused by its compression deformation when practically laminating the ion-conductive high-molecular compounds in between the electrodes to assemble the battery and electro-chromic element etc. Accordingly, in order to make the ion-conductive high-molecular compound into an uniform film, the improvement of mechanical strength is important in addition to the ionic conductivity.

This invention is made in consideration of the above present circumstances, and an object of it is to provide a secondary battery excellent in charge/discharge characteristic and long-term reliability and with high performance.

DISCLOSURE OF THE INVENTION

This invention relates to a secondary battery comprising a cathode composite, an electrolyte and an anode composite, characterized in that the electrolyte is composed of an ion-conductive high-molecular compound including one or more kinds of ionic compounds in a dissolution state, and both the cathode composite and the anode composite have the foregoing ion-conductive high-molecular compound as their component material.

Since the electrolyte is composed of the ion-conductive high-molecular compound in this invention, the formation of dendrite is restricted when using lithium for the anode and the liquid-leakage resistance i.e. the long-term reliability is improved. Further, since the mechanical strength of electrolyte is improved, the short-circuiting is prevented at time of manufacture of the battery and charge/discharge cycle. Moreover, since both the cathode composite and the anode composite have the ion-conductive high-molecular compound as their component material, practical surface areas of the electrode active material in contact with the electrolyte and current collector plate is increased in the cathode composite and the anode composite. For this reason, the cathode composite and the anode composite are improved in their performances. Mechanical strengths of the cathode composite and the anode composite are also improved in the same way as the electrolyte. Therefore, it becomes possible to cope with the problem of expansion and contraction of the electrode active material accompanied by the charging and discharging. From the reason described above, the charge/discharge cycle characteristic is improved.

As the foregoing ion-conductive high-molecular compound; a compound may be mentioned which is prepared by polymerizing a high-molecular compound having reactive double bond and polyether structure so as to have a crosslink network structure. Since such the ion-conductive high-molecular compound is a crosslink polymer formed by ether bond, it does not include intermolecular hydrogen bond so that its structure has a low glass transition temperature. For this reason, migration of dissolved ionic compound becomes extremely easy in such the ion-conductive high-molecular compound. As the foregoing high-molecular compound, for example, compounds shown by a formula (I) and a formula (II) may be mentioned. The formula (I) denotes monoacrylate or monomethacrylate of polyethylene glycol. The formula (II) denotes diacrylate or dimethacrylate of polyethylene glycol.

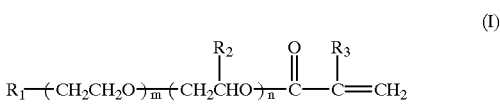
(I)

($R_1$, $R_2$ and $R_3$ are hydrogen or lower alkyl group with one or more carbon number, and m and n are integers lying in ranges of $m \geq 1$, $n \geq 0$ and $n/m = 0$ to 5)

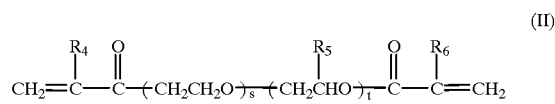
(II)

($R_4$, $R_5$ and $R_6$ are hydrogen or lower alkyl group with one or more carbon number, and s and t are integers lying in ranges of $s \geq 3$, $t \geq 0$ and $t/s = 0$ to 5)

As the ionic compound; inorganic ionic salts including one kind of Li, Na or K such as $LiClO_4$, $LiBF_4$, $LiAsF_6$, $LiPF_6$, LiI, LiBr, $Li_2B_{10}Cl_{10}$, $LiCF_3SO_3$, $LiCF_3CO_2$, LiSCN, NaI, NaSCN, NaBr, $NaClO_4$, $KClO_4$ and KSCN etc.; quaternary ammonium salts such as $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate and $(C_2H_5)_4N$-phthalate etc.; and organic ionic salts such as lithium stearyl sulfonate, sodium octyl sulfonate and lithium dodecylbenzene sulfonate etc.; for example, may be mentioned. These ionic compounds may be used by being combined two or more kinds.

Concerning a compounding ratio of these ionic compounds, a ratio of the ionic compound to ether bond oxygen of the foregoing high-molecular compound is 0.0001 to 5.0 moles, especially a ratio of 0.005 to 2.0 moles is preferable. When a quantity of ionic compound is excessively large, the excessive ionic compound i.e. inorganic ionic salt for example, does not dissociate but is only present as a mixture, so as to result in a decrease of the ionic conductivity. Further, a proper mixing ratio of the ionic compound differs depending on the electrode active material. For example, a ratio around a value offering the maximum ion conductivity of electrolyte is preferable for the battery utilizing the intercalation of layer compound, and a ratio must be set so as to correspond to a change of ion concentration in the electrolyte caused by charging and discharging for the battery using electro-conductive polymer utilizing the doping phenomenon as the electrode active material.

There is no special limitation in an inclusion method of the ionic compound. A method may be mentioned, for example, in which the ionic compound is dissolved in organic solvent such as methyl ethyl ketone or tetrahydrofran etc. and mixed uniformly to the foregoing high-molecular compound, and the organic solvent is then removed under vacuum reduced pressure.

An organic compound which can dissolve the ionic compound may be included in the foregoing ion-conductive high-molecular compound. By doing so, the ionic conductivity can be improved markedly without changing the basic skeleton of ion-conductive high-molecular compound.

As the organic compound which can dissolve the ionic compound; cyclic carbonic ester such as propylene carbonate and ethylene carbonate etc.; cyclic esters such as γ-butyrolactone etc.; ethers such as tetrahydrofuran or its derivative, 1,3-dioxane, 1,2-dimethoxyethane and methyldigraim etc.; nitrites such as acetonitrile and benzonitrile etc.; dioxorane or its derivative; and sulfolane or its derivative etc.; for example, may be mentioned. These compounds may be used independently or by being combined two or more kinds. The kind of material is not limited to them. Compounding ratio and compounding method are at will.

At least one of ethylene oxide polymer or ethylene oxide-propylene oxide polymer may be included in the foregoing ion-conductive high-molecular compound. By doing so, mechanical strengths of the cathode composite, electrolyte and anode composite are improved remarkably. Principal-chain straight-chain type polyethylene oxide may be mentioned as the ethylene oxide polymer.

A binder may be included as a component material in at least one of the cathode composite and the anode composite. By doing so, mechanical strengths of the cathode composite and anode composite are improved remarkably.

The binder is prepared by dissolving or dispersing an organic compound, which will be described later, in a solvent such as dimethylformamide or xylene etc., for example. As the organic compound, polymer or copolymer of the following compounds may be mentioned. As the compounds; acrylonitrile, methacrylonitrile, vinylidine fluoride, vinyl fluoride, chloroprene, vinyl piridine and their derivatives, vinylidine chloride, ethylene, propylene, cyclic diene etc., may be mentioned. As the cyclic diene; cyclopentadiene, 1,3-cyclohexadiene etc., for example, may be mentioned.

As methods for including the binder into the cathode composite and anode composite; a method in which the foregoing organic compound is dissolved in solvent, the electrode active material and ion-conductive high-molecular compound etc. are dispersed in it, and the prepared solution is used as an application liquid; and a method in which the electrode active material and ion-conductive high-molecular compound etc. are dispersed in a dispersant liquid comprising the foregoing organic compound and a dispersant for dispersing the organic compound, and the prepared solution is used as an application liquid etc., are generally used.

Carbon material may be used as the negative active material for the anode composite. The carbon material has a high doping capacity, a low self-discharge rate, an excellent cycle characteristic, and a base-potential extremely near to that of metallic lithium. It does not produce a complicated chemical reaction theoretically at time of the electro-chemical reaction during charging and discharging. Consequently, an extremely excellent charge/discharge cycle characteristic can be obtained when the carbon material is used as the negative active material for the anode composite. In addition, the anode composite becomes extremely stable from physical and electro-chemical points of view.

As the negative active material; alloys including lithium metals such as lithium-aluminum, lithium-lead, lithium-tin, lithium-aluminum-tin, lithium-gallium and Wood's alloys etc., lithium metals and carbon materials etc., may be mentioned. These materials may be used by being combined two or more kinds.

As the carbon material; it is preferable to use materials having analyzed results by diffraction of X-ray as listed in Table 1, carbon powder prepared by burning anisotropic pitch at a temperature of higher than 2,000° C. (average grain size: under 15 microns inclusive), and carbon fiber etc., for example.

TABLE 1

| | |
|---|---|
| Spacing of lattice planes (d002) | 3.35 ~ 3.40Å |
| Size of crystallite in a-axis direction | La: 200Å or more |
| Size of crystallite in c-axis direction | Lc: 200Å or more |
| True density | 2.00 ~ 2.25 g/cm$^3$ |

As the positive active material for use in the cathode composite, the following materials may be mentioned. There are I-group metallic compounds such as $CuO$, $Cu_2O$, $Ag_2O$, $CuS$ and $CuSO_4$ etc.; IV-group metallic compounds such as $TiS_2$, $SiO_2$ and $SnO$ etc., V-group metallic compounds such as $V_2O_5$, $V_6O_{12}$, $VO_x$, $Nb_2O_5$, $Bi_2O_3$ and $Sb_2O_3$ etc.; VI-group metallic compounds such as $CrO_3$, $Cr_2O_3$, $MoS_2$, $WO_3$ and $SeO_2$ etc.; VII-group metallic compounds such as $MnO_2$ and $Mn_2O_3$ etc.; VIII-group metallic compounds such as $Fe_2O_3$, $FeO$, $Fe_3O_4$, $Ni_2O_3$, $NiO$, $CoS_2$ and $CoO$ etc.; metallic compounds such as lithium-cobalt composite oxide and lithium-manganese composite oxide etc., for example, expressed by general formulas of $Li_xMX_2$ and $Li_xMN_yX_2$ (M and N are I- through VIII-group metals and X is chalcogens compound such as oxygen and sulfur etc.); electro-conductive high-molecular compounds such as polypyrrole, polyaniline, polyparaphenylene, polyacetylene and polyacene group materials; and pseudo-graphite structural carbon material etc. However, the kind of positive active material is not limited to them.

Concerning an application method of the ion-conductive high-molecular compound on surfaces of the cathode composite and the anode composite; it is preferable to apply the compound into an uniform thickness by means of, for example, a roller coating using an applicator roll, a doctor blade method, a spin coating and bar coder etc. However, the kind of application method is not limited to them. By using these means, it become possible to apply the foregoing ion-conductive high-molecular compound on the surfaces of the cathode composite and the anode composite in a voluntary thickness and a voluntary shape.

Concerning an application method of the cathode composite and the anode composite on the positive current collector plate and the negative current collector plate respectively, it is preferable to apply the composite into an uniform thickness by means of, for example, a roller coating using an applicator roll, a doctor blade method, a spin coating and bar coder etc. However, the kind of application method is not limited to them. By using these means, it becomes possible to increase practical surface areas of the electrode active material in contact with the electrolytes and current collector plates in the cathode composite and the anode composite, and it become possible to apply the cathode composite and the anode composite on the positive current collector plate and the negative current collector plate in a voluntary thickness and a voluntary shape. In these cases, carbon such as graphite, carbon black and acetylene black etc. (This carbon has properties quite different from those of the carbon used for the negative active material.) and electro-conductive material such as metallic powder and electro-conductive metal oxide etc. are mixed in the cathode composite and the anode composite as occasion demands, so that an electron conductivity may be improved. Further, in order to obtain an uniform mixed and dispersed system when manufacturing the cathode composite and the anode composite, several kinds of dispersants and dispersion mediums may be added. In addition, a thickener, an extender and a tackifier may be added.

It is preferable to use aluminum, stainless steel, titan and copper etc. for the positive current collector plate and to use stainless steel, iron, nickel and copper etc. for the negative current collector plate. However, the kind of material is not limited to them.

BEST MODE FOR CARRYING OUT THE INVENTION (Embodiment 1)

Figure 1:
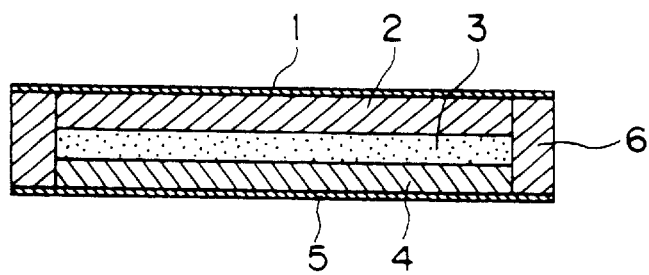
FIG. 1 is a vertical sectional view showing a film type battery which is an example of secondary battery of this invention.

FIG. 1 is a vertical sectional view showing a film type battery which is an example of secondary battery of this invention. In this figure, 1 is a positive current collector plate comprising aluminum, 2 is a cathode composite, 3 is an electrolyte layer, 4 is an anode composite, 5 is a negative current collector plate comprising stainless steel and 6 is a sealing material comprising denatured polypropylene. The both current collector plates 1 and 5 serve also as outer packages.

In the film type battery of this invention, the cathode composite 2 is composed of a positive active material, a conductive material and an ion-conductive high-molecular compound. The anode composite 4 is composed of a negative active material and an ion-conductive high-molecular compound. The electrolyte layer 3 is composed of an ion-conductive high-molecular compound.

The film type battery of this embodiment was made up through the following processes (a) to (d).

(a); The cathode composite 2 was formed in the following manner. LiCoO$_2$ forming the positive active material was mixed to acetylene black forming the conductive material with a weight ratio of 85 to 15 (mixture A$_1$). While, 10 weight parts of high-molecular mixture prepared by mixing the high-molecular compound of formula (III) to the high-molecular compound of formula (IV) with a weight ratio of 4 to 6, were mixed with 0.03 weight part of azobisisobutylonitrile, 1 weight part of LiBF$_4$, 10 weight parts of 1,2-dimethoxyethane and 10 weight parts of γ-butylolactone (mixture B$_1$). The mixture A$_1$ and the mixture B$_1$ were mixed with a weight ratio of 10 to 3 under an atmosphere of dried inert gas. The mixture thus prepared was cast by means of screen coating on the positive current collector plate 1 on a surface of which a conductive carbon film was formed. Thereafter, the mixture was left as it was for one hour at a temperature of 100° C. under an atmosphere of dried inert gas so as to be cured. A film thickness of the cathode composite 2 formed on the positive current collector plate 1 was 60 microns. A molecular weight of the compound of formula (III) is 400 and an average molecular weight of the compound of formula (IV) is 5,000.

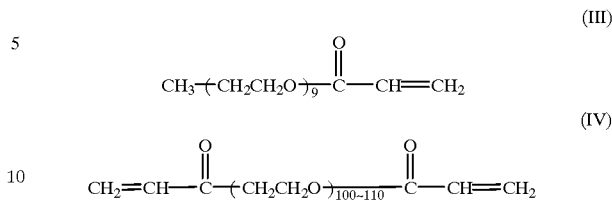

(b); The anode composite 4 was formed in the following manner. 10 weight parts of high-molecular mixture same with that of the process (a) were mixed with 1 weight part of LiBF$_4$, 0.03 weight part of azobisisobutylonitrile, 10 weight parts of 1,2-dimethoxyethane and 10 weight parts of γ-butylolactone. This mixture was mixed to carbon powder forming the negative active material with a weight ratio of 3 to 7 under the atmosphere of dried inert gas. The mixture thus prepared was cast by means of screen coating on the negative current collector plate 5, and was left as it was for one hour at a temperature of 100° C. under the atmosphere of dried inert gas so as to be cured. A thickness of the anode composite 4 formed on the negative current collector plate 5 was 30 microns.

(c); The electrolyte layer 3 was formed on the anode composite 4 in the following manner. 30 weight parts of high-molecular mixture same with that of the process (a) were mixed with 6 weight parts of LiBF$_4$, 0.05 weight part of azobisisobutylonitrile, 32 weight parts of 1,2-dimethoxyethane and 32 weight parts of γ-butylolactone. This mixture was cast by means of screen coating on the anode composite 4, and was left as it was for one hour at a temperature of 100° C. under the atmosphere of dried inert gas so as to be cured. A thickness of the electrolyte layer 3 formed on the anode composite 4 was 25 microns.

In the processes (a) through (c), the high-molecular compounds of formulas (III) and (IV) were polymerized by heat to form ion-conductive high-molecular compounds having crosslink network structures under an existence of azobisisobutylonitrile forming a reaction initiator. LiBF$_4$ forming the ionic compound is included in the prepared ion-conductive high-molecular compound under a state of being preferably dissolved by 1,2-dimethoxyethane and γ-butylolactone.

(d); A laminate of the cathode composite 2 and the positive current collector plate 1 prepared by the process (a) and a laminate of the electrolyte layer 3, the anode composite 4 and the negative current collector plate 5 prepared by the process (c) were made contact each other at the cathode composite 2 and the electrolyte layer 3. Thereby, the film type battery shown in FIG. 1 was prepared.

In the process (c), the electrolyte layer 3 was formed on the anode composite 4. However, it may be formed on the cathode composite 2.

(Embodiment 2)

A film type battery of this embodiment also has the same structure as that of the battery shown in FIG. 1. The cathode composite 2 is composed of the positive active material, the conductive material and the ion-conductive high-molecular compound. The anode composite 4 is composed of the negative active material and the ion-conductive high-molecular compound. The electrolyte layer 3 is composed of the ion-conductive high-molecular compound.

The film type battery of this embodiment was made up through the following processes (a) to (e).

(a); The cathode composite 2 was formed in the following manner. The mixture $A_1$ same with that of the embodiment 1 was prepared. While, 10 weight parts of high-molecular mixture prepared by mixing the high-molecular compound of formula (III) to the high-molecular compound of formula (IV) with a weight ratio of 4 to 6, were mixed with 1 weight part of $LiBF_4$, 10 weight parts of 1,2-dimethoxyethane and 10 weight parts of γ-butylolactone (mixture $B_2$). The mixture $A_1$ and the mixture $B_2$ were mixed with a weight ratio of 10 to 3 under the atmosphere of dried inert gas. The mixture thus prepared was cast by means of screen coating on the positive current collector plate 1 on the surface of which the conductive carbon film was formed. Thereafter, the mixture was irradiated with electron beam including an electron beam intensity of 12 Mrad under the atmosphere of dried inert gas so as to be cured. A film thickness of the cathode composite 2 formed on the positive current collector plate 1 was 60 microns.

(b); The electrolyte layer 3 was formed on the cathode composite 2 in the following manner. 30 weight parts of high-molecular mixture same with that of the process (a) were mixed with 6 weight parts of $LiBF_4$, 32 weight parts of 1,2-dimethoxyethane and 32 weight parts of γ-butylolactone (mixture $C_2$). This mixture $C_2$ was cast by means of screen coating on the cathode composite 2, and was irradiated with electron beam including an electron beam intensity of 8 Mrad under the atmosphere of dried inert gas so as to be cured. A thickness of the electrolyte layer 3 formed on the cathode composite 2 was 25 microns.

(c); The anode composite 4 was formed in the following manner. The mixture $B_2$ same with that of the process (a) was prepared. This mixture $B_2$ was mixed to carbon powder forming the negative active material with a weight ratio of 2 to 8 under the atmosphere of dried inert gas. The mixture thus prepared was cast by means of screen coating on the negative current collector plate 5, and was irradiated with electron beam including an electron beam intensity of 12 Mrad under the atmosphere of dried inert gas so as to be cured. A thickness of the anode composite 4 formed on the negative current collector plate 5 was 30 microns.

(d); The electrolyte layer 3 was formed on the anode composite 4 in the following manner. The mixture $C_2$ same with that of the process (b) was prepared. This mixture $C_2$ was cast by means of screen coating on the anode composite 4, and was irradiated with electron beam including an electron beam intensity of 8 Mrad under the atmosphere of dried inert gas so as to be cured. A thickness of the electrolyte layer 3 formed on the anode composite 4 was 25 microns.

In the processes (a) through (d), the high-molecular compounds of formulas (III) and (IV) were polymerized by irradiation of electron beam to form the ion-conductive high-molecular compound having crosslink network structures. $LiBF_4$ forming the ionic compound was included in the prepared ion-conductive high-molecular compound under a state of being preferably dissolved by 1,2-dimethoxyethane and γ-butylolactone.

(e); A laminate of the electrolyte layer 3, the cathode composite 2 and the positive current collector plate 1 prepared by the process (b) and a laminate of the electrolyte layer 3, the anode composite 4 and the negative current collector plate 5 prepared by the process (d) were made contact each other at the respective electrolyte layers 3. Thereby, the film type battery having the structure shown in FIG. 1 was prepared.

(Embodiment 3)

A film type battery of this embodiment also has the same structure as that of the battery shown in FIG. 1. The negative current collector plate 5 comprises a copper foil, and the cathode composite 2 is composed of the positive active material, the conductive material, the ion-conductive high-molecular compound and the binder. The anode composite 4 is composed of the negative active material, the ion-conductive high-molecular compound and the binder. The electrolyte layer 3 is composed of the ion-conductive high-molecular compound.

The film type battery of this embodiment was made up through the following processes (a) to (e).

(a); The cathode composite 2 was formed in the following manner. $LiCoO_2$ forming the positive active material was mixed to acetylene black forming the conductive material with a weight ratio of 85 to 15. This mixture was mixed to dimethylformamide solution (2 wt %) of polyacrylonitrile forming the binder with a weight ratio of 2.4 to 2 under the atmosphere of dried inert gas (mixture $A_3$). While, the mixture $B_2$ same with that of the embodiment 2 was prepared. The mixture $A_3$ and the mixture $B_2$ were mixed with a weight ratio of 10 to 3 under the atmosphere of dried inert gas. The mixture thus prepared was cast by means of screen coating on the positive current collector plate 1 on the surface of which the conductive carbon film was formed. Thereafter, the mixture was irradiated with electron beam including an electron beam intensity of 12 Mrad under the atmosphere of dried inert gas so as to be cured. A film thickness of the cathode composite 2 formed on the positive current collector plate 1 was 60 microns.

(b); The electrolyte layer 3 was formed on the cathode composite 2 in the following manner. 30 weight parts of high-molecular mixture prepared by mixing the high-molecular compound of formula (III) to the high-molecular compound of formula (IV) with a weight ratio of 3.8 to 6.2 were mixed with 6 weight parts of $LiBF_4$, 32 weight parts of 1,2-dimethoxyethane and 32 weight parts of γ-butylolactone (mixture $C_3$). This mixture $C_3$ was cast by means of screen coating on the cathode composite 2 under the atomosphere of dried inert gas, and was irradiated with electron beam including an electron beam intensity of 8 Mrad under the atmosphere of dried inert gas so as to be cured. A thickness of the electrolyte layer 3 formed on the cathode composite 2 was 25 microns.

(c); The anode composite 4 was formed in the following manner. Carbon powder forming the negative active material was mixed to xylene solution (2 wt %) of copolymer of ethylene-propylene-cyclopentadiene forming the binder with a weight ratio of 2 to 5 under the atmosphere of dried inert gas (mixture $D_3$). While, 10 weight parts of high-molecular mixture prepared by mixing the high-molecular compound of formula (III) to the high-molecular compound of formula (IV) with a weight ratio of 3.6 to 6.4 were mixed with 1 weight part of $LiBF_4$, 10 weight parts of 1,2-dimethoxyethane and 10 weight parts of γ-butylolactone (mixture $E_3$). The mixture $D_3$ and the mixture $E_3$ were mixed with a weight ratio of 8 to 2 under the atmosphere of dried inert gas. The mixture thus prepared was cast by means of screen coating on the negative current collector plate 5, and was irradiated with electron beam including an electron beam intensity of 12 Mrad under the atmosphere of dried inert gas so as to be cured. A film thickness of the anode composite 4 formed on the negative current collector plate 5 was 30 microns.

(d); The electrolyte layer 3 was formed on the anode composite 4 in the following manner. The mixture $C_3$ same with that of the process (b) was prepared. This mixture $C_3$ was cast by means of screen coating on the anode composite 4 under the atmosphere of dried inert gas, and was irradiated with electron beam including an electron beam intensity of 8 Mrad under the atmosphere of dried inert gas so as to be cured. A thickness of the electrolyte layer 3 formed on the anode composite 4 was 25 microns.

In the processes (a) through (d), the high-molecular compounds of formulas (III) and (IV) were polymerized by irradiation of electron beam to form the ion-conductive high-molecular compound having crosslink network structures. $LiBF_4$ forming the ionic compound was included in the prepared ion-conductive high-molecular compound under a state of being preferably dissolved by 1,2-dimethoxyethane and γ-butylolactone. The binder is included in the cathode composite 2 and the anode composite 4 respectively.

(e); A laminate of the electrolyte layer 3, the cathode composite 2 and the positive current collector plate 1 prepared by the process (b) and a laminate of the electrolyte layer 3, the anode composite 4 and the negative current collector plate 5 prepared by the process (d) were made contact each other at the respective electrolyte layers 3. Thereby, the film type battery having the structure shown in FIG. 1 was prepared.

(Embodiment 4)

A film type battery of this embodiment also has the same structure as that of the battery shown in FIG. 1. The negative current collector plate 5 comprises a copper foil, and the cathode composite 2 is composed of the positive active material, the conductive material, the ion-conductive high-molecular compound and the binder. The anode composite 4 is composed of the negative active material, the ion-conductive high-molecular compound and the binder. The electrolyte layer 3 is composed of the ion-conductive high-molecular compound. These ion-conductive high-molecular compounds include ethylene oxide polymer.

The film type battery of this embodiment was made up through the following processes (a) to (e).

(a); The cathode composite 2 was formed in the following manner. The mixture $A_3$ same with that of the embodiment 3 was prepared. While, 10 weight parts of high-molecular mixture prepared by mixing the high-molecular compound of formula (III) to the high-molecular compound of formula (IV) with a weight ratio of 4 to 6, were mixed with 1 weight part of $LiBF_4$, 10 weight parts of 1,2-dimethoxyethane, 10 weight parts of γ-butylolactone and 0.06 weight part of principal-chain straight-chain type polyethylene oxide (average molecular weight: 150,000) (mixture $B_4$). The mixture $A_3$ and the mixture $B_4$ were mixed with a weight ratio of 10 to 3 under the atmosphere of dried inert gas. The mixture thus prepared was cast on the positive current collector plate 1 and was irradiated with electron beam so as to be cured, in the same way as the process (a) of embodiment 3. A film thickness of the cathode composite 2 formed on the positive current collector plate 1 was 60 microns.

(b); The electrolyte layer 3 was formed on the cathode composite 2 in the following manner. 30 weight parts of high-molecular mixture prepared by mixing the high-molecular compound of formula (III) to the high-molecular compound of formula (IV) with a weight ratio of 3.8 to 6.2, were mixed with 6 weight parts of $LiBF_4$, 32 weight parts of 1,2-dimethoxyethane, 32 weight parts of γ-butylolactone and 0.2 weight part of principal-chain straight-chain type polyethylene oxide (average molecular weight: 150,000) (mixture $C_4$). This mixture $C_4$ was cast on the cathode composite 2 and was irradiated with electron beam so as to be cured, in the same way as the process (b) of embodiment 3. A thickness of the electrolyte layer 3 formed on the cathode composite 2 was 25 microns.

(c); The anode composite 4 was formed in the following manner. The mixture $D_3$ same with that of the embodiment 3 was prepared. While, 10 weight parts of high-molecular mixture prepared by mixing the high-molecular compound of formula (III) to the high-molecular compound of formula (IV) with a weight ratio of 3.6 to 6.4, were mixed with 1 weight part of $LiBF_4$, 10 weight parts of 1,2-dimethoxyethane, 10 weight parts of γ-butylolactone and 0.06 weight part of principal-chain straight-chain type polyethylene oxide (average molecular weight: 150,000) (mixture $E_4$). The mixture $D_3$ and the mixture $E_4$ were mixed with a weight ratio of 8 to 2 under the atmosphere of dried inert gas. The mixture thus prepared was cast on the negative current collector plate 5 and was irradiated with electron beam so as to be cured, in the same way as the process (c) of embodiment 3. A film thickness of the anode composite 4 formed on the negative current collector plate 5 was 30 microns.

(d); The electrolyte layer 3 was formed on the anode composite 4 in the following manner. The mixture $C_4$ same with that of the process (b) was prepared. This mixture $C_4$ was cast on the anode composite 4 and was irradiated with electron beam so as to be cured, in the same way as the process (d) of embodiment 3. A thickness of the electrolyte layer 3 formed on the anode composite 4 was 25 microns.

In the processes (a) through (d), the high-molecular compounds of formulas (III) and (IV) were polymerized by irradiation of electron beam to form the ion-conductive high-molecular compound having crosslink network structures. $LiBF_4$ forming the ionic compound was included in the prepared ion-conductive high-molecular compound under a state of being preferably dissolved by 1,2-dimethoxyethane and γ-butylolactone, and the principal-chain straight-chain type polyethylene oxide is also included therein. The binder is included in the cathode composite 2 and the anode composite 4.

(e); A laminate of the electrolyte layer 3, the cathode composite 2 and the positive current collector plate 1 prepared by the process (b) and a laminate of the electrolyte layer 3, the anode composite 4 and the negative current collector plate 5 prepared by the process (d) were made contact each other at the respective electrolyte layers 3. Thereby, the film type battery having the structure shown in FIG. 1 was prepared.

(COMPARISON EXAMPLE 1)

A film type battery to be compared was made up through the following processes (a) to (d). This film type battery was composed of the positive current collector plate, the cathode composite, the electrolyte layer, the anode, the negative current collector plate and the sealing agent.

(a); The cathode composite was formed in the same way as the embodiment 1.

(b); The anode was comprised lithium metal forming the negative active material, and was formed by being press bonded to the negative current collector plate comprising stainless steel.

(c); The electrolyte layer was formed on the anode in the following manner. 30 weight parts of high-molecular mixture prepared by mixing the high-molecular compound of formula (III) to the high-molecular compound of formula (IV) with a weight ratio of 4 to 6, were mixed with 0.05 weight part of azobisisobutylonitrile, 6 weight parts of LiBF$_4$, 32 weight parts of 1,2-dimethoxyethane and 32 weight parts of γ-butylolactone. This mixture was cast on the anode and left as it was for one hour at a temperature of 100° C. under the atmosphere of dried inert gas so as to be cured. A thickness of the prepared electrolyte layer was 25 microns.

(d); A laminate of the cathode composite and the positive current collector plate prepared by the process (a) and a laminate of the electrolyte layer, the anode and the negative current collector plate prepared by the process (c) were made contact each other at the cathode composite and the electrolyte layer respectively. Thereby, the battery of comparison example was prepared.

The following charge/discharge cycle tests were done on the batteries of embodiments 1 to 4 and comparison example 1. Battery electrode surface area can be changed variously by the manufacturing process, and the area was set to 100 cm$^2$ in these tests.

Conditions of charge/discharge cycle test were as follows: Temperature; 25° C., constant-current constant-voltage charge at 50 μA/cm$^2$, constant-current discharge at 50 μA/cm$^2$, charge end voltage; 4.1 V, discharge end voltage; 2.7 V.

Figure 2:
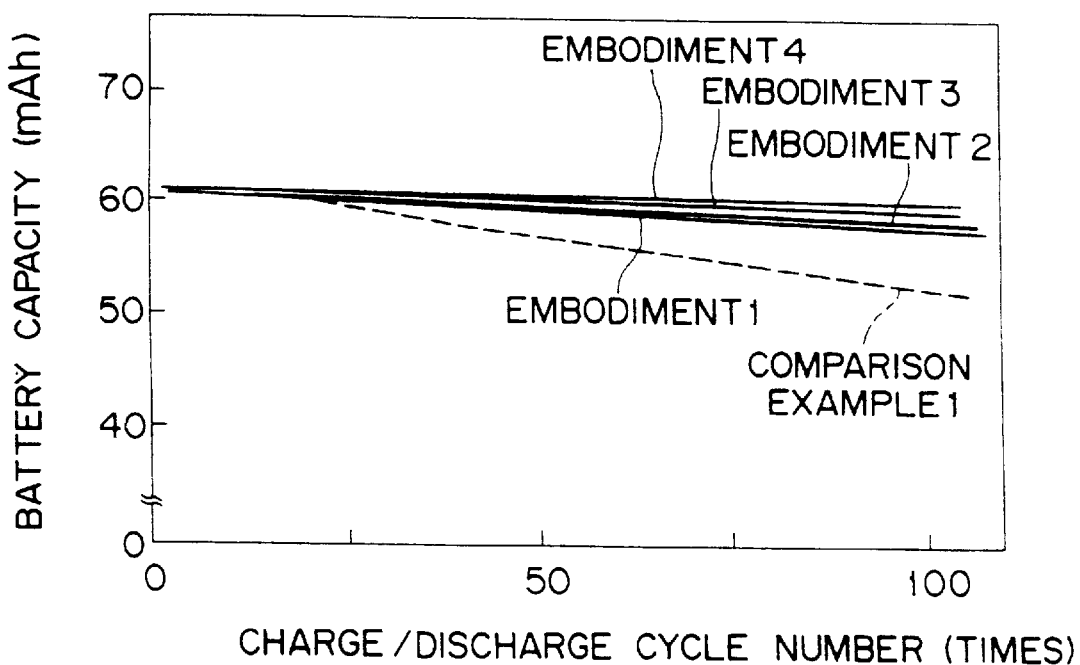
FIG. 2 is a diagram showing results of charge/discharge cycle test for film type batteries of embodiments 1 to 4 and a comparison example 1.

FIG. 2 shows results of the charge/discharge cycle tests. In FIG. 2, an axis of abscissa denotes a charge/discharge cycle number (times) and an axis of ordinate denotes a battery capacity (mAh). It can be understood that the batteries of embodiments 1 to 4 offer more excellent charge/discharge cycle characteristics than that of the battery of comparison example 1. In the batteries of embodiments 3 and 4, mechanical strengths of the cathode composite 2 and the anode composite 4 are improved because they include the binder, so that these batteries offer more excellent charge/discharge cycle characteristics than those of the batteries of embodiments 1 and 2. Especially, in the battery of embodiment 4, a strength of the ion-conductive high-molecular compound is improved because the principal-chain straight-chain type polyethylene oxide is included in it. Therefore, the cathode composite 2, the electrolyte layer 3 and the anode composite 4 in the battery of embodiment 4 are further improved in their mechanical strengths, so that it offers a better charge/discharge cycle characteristic than that of the battery embodiment 3.

What is claimed is:

1. A secondary battery comprising a cathode composite, an electrolyte, and an anode composite containing carbon material as a negative active material; said electrolyte comprising an ion-conductive cross-linked high-molecular weight polymer, an ionic compound, and an organic compound which can dissolve said ionic compound; both the cathode composite and the anode composite comprising the ion-conductive cross-linked high-molecular weight polymer; said ion-conductive cross-linked high-molecular weight polymer being formed by polymerizing a high-molecular weight compound having a reactive double bond and a polyether structure to thereby form a cross-linked network structure, said high-molecular weight compound comprising a compound of the formula (II):

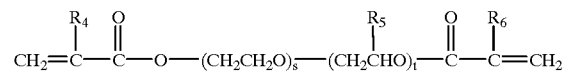

and, optionally, a compound of the formula (I)

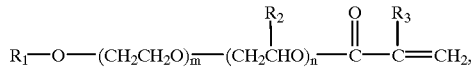

wherein $R_1$, $R_2$, $R_3$, $R_4$, $R_5$, and $R_6$ are hydrogen or lower alkyl having from 1 to 5 carbon atoms, m and n are integers lying in the range of m≧1, n≧0, and n/m=0 to 5, and s and t are integers lying in the range of s≧3, t≧0, and t/s=0 to 5;

wherein the ion-conductive high-molecular polymer includes at least one of ethylene oxide polymer and ethylene oxide-propylene oxide polymer; and wherein at least one of the cathode composite and the anode composite further comprises a binder.

* * * * *